United States Patent [19]
Raskin

[11] 4,262,763
[45] Apr. 21, 1981

[54] SORT-BY-WEIGHT AND LABELLING METHOD AND APPARATUS

[76] Inventor: Seymour H. Raskin, 7333 Rustic Valley Dr., Dallas, Tex. 75248

[21] Appl. No.: 18,440

[22] Filed: Mar. 7, 1979

[51] Int. Cl.³ .................... G01G 23/38; G01G 19/52; G01G 3/14; B07C 5/16
[52] U.S. Cl. ......................................... 177/4; 177/50; 177/211; 209/592; 209/900
[58] Field of Search .................... 177/50, 211, 123, 4; 209/590, 592, 599, 900

[56] References Cited
U.S. PATENT DOCUMENTS

| | | | |
|---|---|---|---|
| 3,220,550 | 11/1965 | Gilbert | 177/50 X |
| 3,814,196 | 6/1974 | McClusky | 177/123 X |
| 3,901,797 | 8/1975 | Storace et al. | 177/50 X |

Primary Examiner—George H. Miller, Jr.
Attorney, Agent, or Firm—Gerald G. Crutsinger; John F. Booth; Harry C. Post, III

[57] ABSTRACT

Device to determine the weight of an object by moving the object at a predetermined velocity into a probe, a sensor associated with the probe to indicate the change in momentum to determine the weight.

18 Claims, 18 Drawing Figures

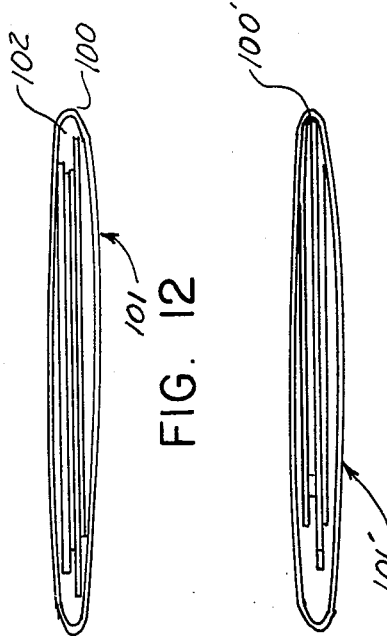
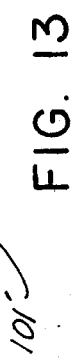
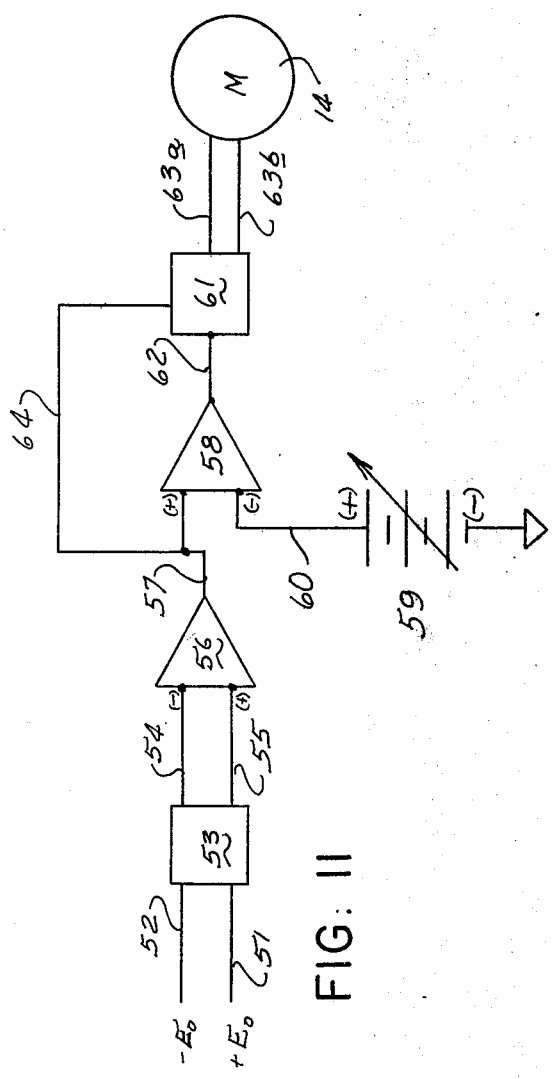
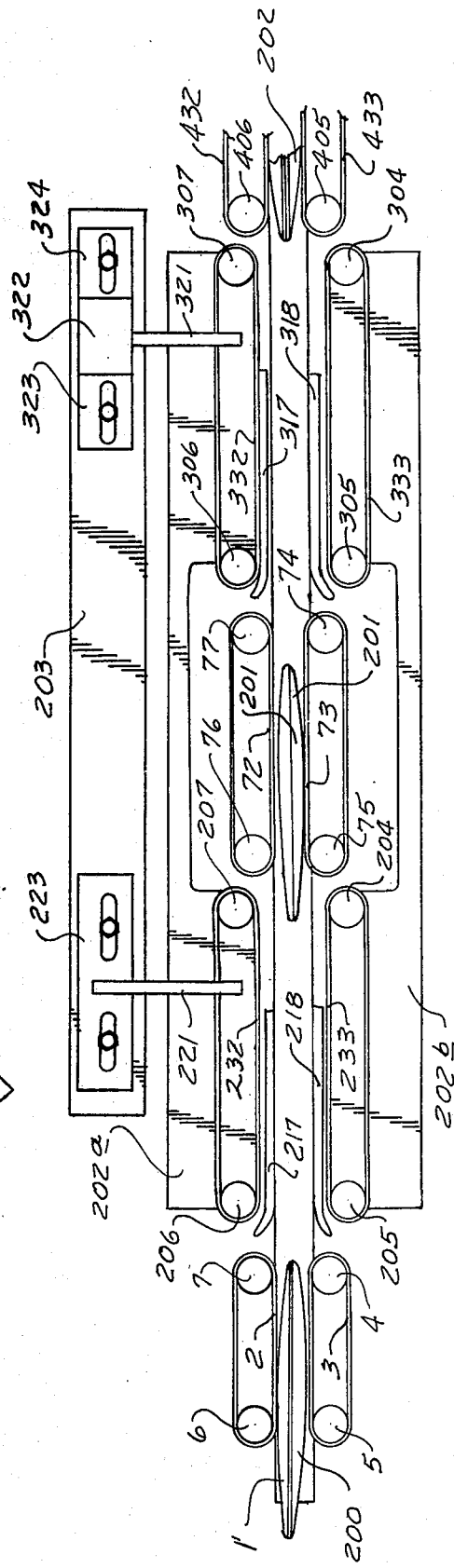
FIG. 12
FIG. 13
FIG. 11
FIG. 14

SORT-BY-WEIGHT AND LABELLING METHOD AND APPARATUS

BACKGROUND

Many business and manufacturing operations require that a large number of objects be moved at a high rate of speed, where each individual object is moved in sequence as part of a continuous series of similar objects. Such operations frequently require that the weight of each individual object be measured before the object reaches a predetermined location. Examples of such operations would include packaging pharmaceutical capsules to determine whether or not each package contains a predetermined number of capsules; packaging electronic components to determine whether or not a package contains, for example, a predetermined number of transistors; packaging envelopes containing granular material; and mail sorting operations to determine the proper postage on each parcel.

The requirement for measuring the weight of each object may stem from the need to assure that each object contains a predetermined quantity of material. In that case, the measured weight information may be used to classify and physically sort the objects into groups, where each group of objects is classified according to predetermined weight values.

Other operations, however, may require that each item be labelled according to its own individual weight value. Information recorded on the label may simply indicate the gross weight of the object. In other cases, label information may be expressed in units which are proportional to weight as, for example, price of the object or the piece count of items contained in the object.

Automatic and high speed weighing of individual objects in a moving series of objects have been accomplished by a number of methods which are old and common in the art. But significant errors in the weight measurement often result from undesirable forces being introduced into the weight sensing function from sources other than weight of the object. Such erroneous forces may be caused by friction or vibration in the drive mechanism that moves the object. Other undesirable forces may result from aerodynamic effects on a rapidly moving object which has a large surface area relative to its mass.

SUMMARY OF INVENTION

The invention described herein provides a method for determining the weight of a moving object, comprising the steps of engaging and moving the object in a selected direction at a predetermined and controlled velocity, temporarily releasing the object when it reaches a predetermined location at which time the momentum of the object is proportional to its known velocity and its unknown mass, impinging the object against a stationary elastic member, measuring the deflection or displacement of the elastic member which results from impingement, and generating a signal which is proportional only to the mass, calibrating the signal in terms of weight which is proportional only to mass of the object, causing the object to move away from the impingement location after the weight of the object has been determined, and recapturing control of the object.

Apparatus for carrying out the method described above for determining the weight of a moving object comprises drive means for engaging and moving the object in a selected direction and at a controlled velocity and disengaging the object adjacent an elastic member located in the path of movement of the object such that the object will impinge against the elastic member. Sensor means is provided to generate a signal which is proportional to the deflection or displacement of the elastic member which results from the impingement of the elastic member. Calibration means is provided to convert the sensor output signal into a value proportional to the weight of the object. After the weight of the object has been determined, the object is recaptured at a position remote from the location at which weight was determined. Further, the output signal is delivered to apparatus to determine, based on weight of each object, the route along which each object is moved and to print the weight and related indicia on each object or group of objects.

It is a primary object of the invention to provide a method and apparatus for accurate, high speed determination of weight of a moving object by measuring the change in momentum produced by an impluse which occurs when the object impinges upon an elastic member, and converting the resultant measurement signal into readout units proportional to weight of the object.

A further object of the invention to provide a method and apparatus for maintaining control of the position of an object at all times during movement of the object to and from a weight measurement position, whereby such control will produce substantially no erroneous inputs to the measurement function.

A still further object of the invention is to recapture control of the object after completion of the weight determination such that disposition of the object depends upon the weight of the object.

BRIEF DESCRIPTION OF THE DRAWINGS

Drawings of a preferred embodiment of the invention are enclosed so that the invention may be better and more fully understood, in which:

FIG. 11 is a block diagram of the electronic instrumentation of a simple over-and-under sort-by-weight apparatus illustrated in FIGS. 1-10;

FIG. 12 is a cross-sectional view taken along line D—D of FIG. 5, with the contents of the object in the condition existing before impingement;

FIG. 13 is a cross-sectional view similar to FIG. 12, except that the contents are in a condition existing after impingement;

FIG. 14 is a plan view of a second embodiment of the invention in which a repetitive series of similar objects are shown being processed in sequence;

Numeral references are employed to designate like parts throughout the various figures of the drawing.

DESCRIPTION OF PREFERRED EMBODIMENTS

Figure 1:
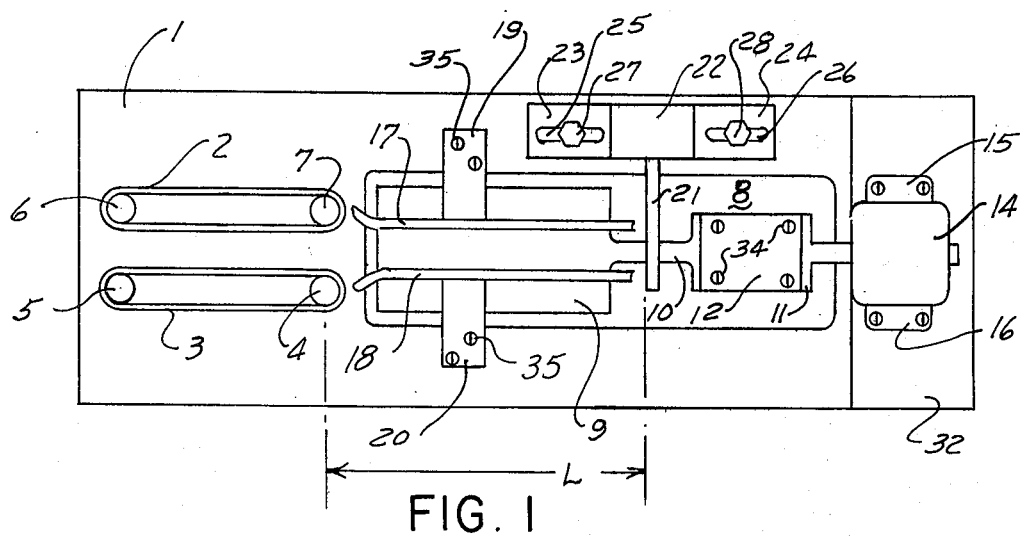
FIG. 1 is a plan view of a first embodiment of the invention in which the determination of weight is used simply to sort objects as being over or under a preselected weight value.

A first embodiment of the invention is illustrated in FIGS. 1-11 wherein articles are moved one at a time into engagement with a probe for determining the weight of the objects and directing each object to a route depending upon the weight of object.

A second embodiment of the invention is illustrated in the remaining figures incorporating apparatus to pre-position objects in a parcel or envelope prior to weighing and to print weight-related indicia on the parcel.

Referring first to FIGS. 1-11, the number 1 designates a fixed base plate to which all other apparatus is attached. Feed belts 2 and 3 are driven by pairs of rollers 6, 7 and 4, 5, respectively, in the direction shown by the arrows. The belts are spaced from each other a distance appropriate to engage an object which is placed between the belts and to drive the object in the direction shown at a controlled and constant velocity. Base plate 1 is provided with a cavity 8 in order to accommodate a support and disposal means comprising integral portions 9, 10 and 11. Plate portion 11 is attached by means of screws 34 to a block 12 rigidly attached to shaft 13. As will be hereinafter more fully explained, shaft 13 may be rotated by bi-directional motor 14 in order to dispose of the objects which have been weighed. Motor 14 has mounting flanges 15 and 16 which are attached by screws to a base plate 32 secured to main base plate 1. Fixed guide rails 17 and 18 are attached to base plate 1 by brackets 19 and 20 and screws 35.

Probe 21 extends into the path formed by the space between guide rails 17 and 18. Probe 21 is in turn attached to sensing structure enclosed within housing 22. Housing 22 has integral flanges 23 and 24 for attachment to main base plate 1 by means of bolts 27 and 28. Slots 25 and 26 permit adjustment of the location of probe 21 so that dimension L can be set at its optimum value relative to the size of the package that is to be weighed.

Figure 2:
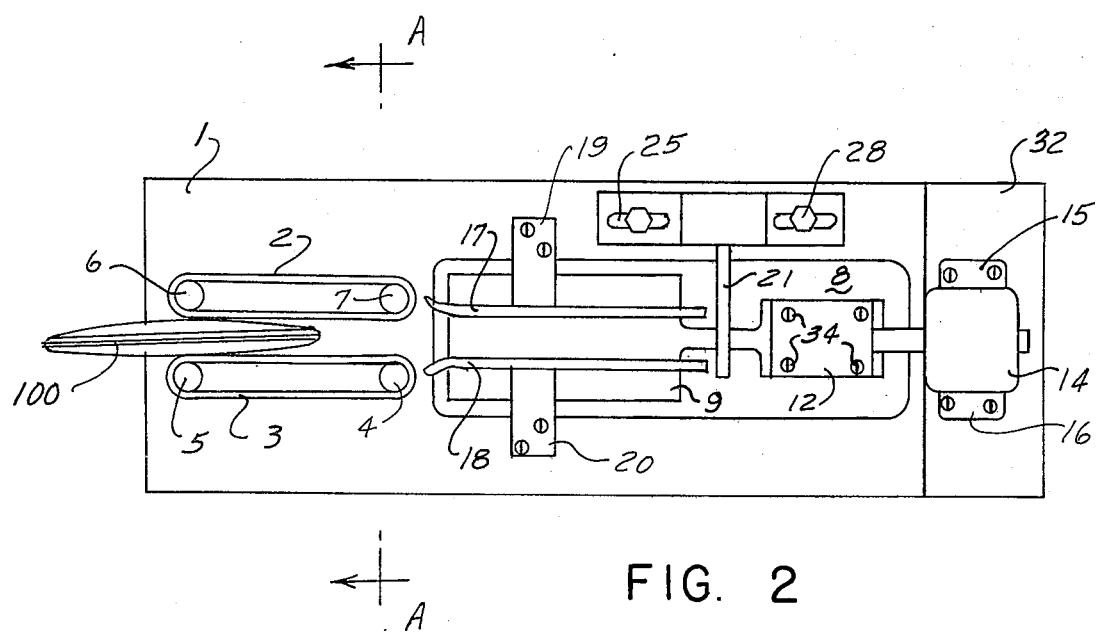
FIG. 2 is a plan view similar to FIG. 1 with an object to be weighed being fed into the apparatus.

In FIG. 2 an object, as for example, an envelope 100 has just been inserted into the feed belts. Envelope 100 contains a plurality of separate items. The gross weight of the envelope and its contents must be determined for application of postage.

Figure 3:
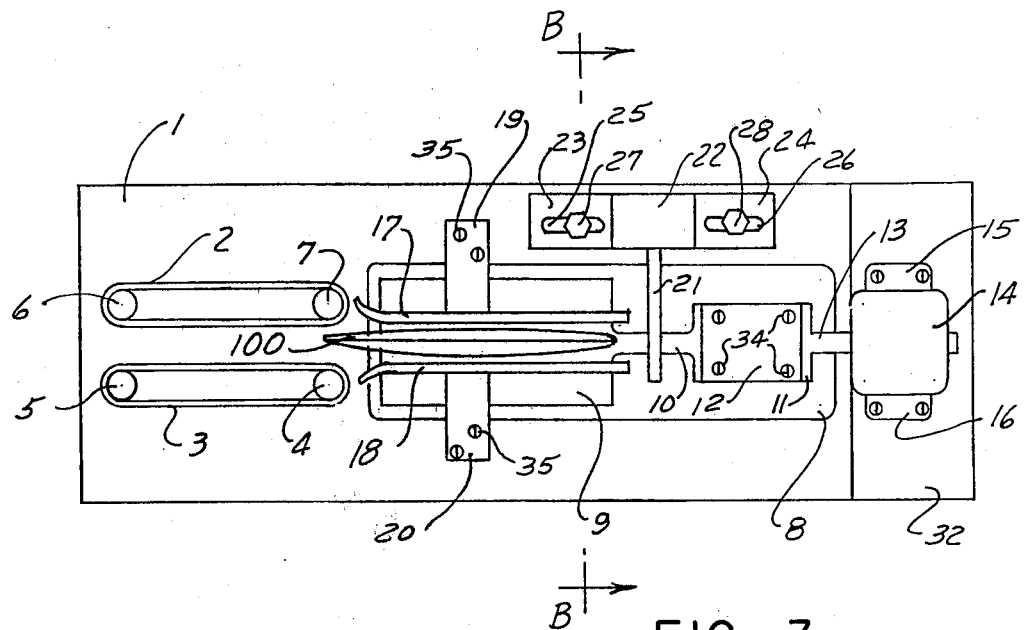
FIG. 3 is a plan view similar to FIG. 1, with the object in position at the instant it is being released by a drive mechanism shown in FIG. 1.

In FIG. 3, envelope 100 has already been conveyed through feed belts 2 and 3 and has just been released from the feed belts. At the instant envelope 100 was released by feed belts 2 and 3, it was travelling at a controlled and known velocity. Dimension L has been selected so that at the instant the rear edge of envelope 100 leaves the feed belts, the envelope need travel a very short distance before impacting probe 21. By way of explanation and not limitation, dimension L should be, for example, equal to the length of the envelope plus one quarter inch.

During the last one quarter inch of travel of envelope 100, the envelope may be vertically supported by plate 9. It is desirable that the material forming the surface of plate 9 be selected as having a very low coefficient of friction. Any frictional force introduced by plate 9 into envelope 100, where such frictional force tends to decelerate the velocity of the envelope and reduce the envelope's momentum, will be insignificant in that the frictional force will be proportional to the weight of the object and can be calibrated out. If it is deemed expedient to do so, plate 9 may be positioned below the level of plate 1 so that the envelope will not contact plate 9 until after it impinges against probe 21.

In view of the very short distance that the envelope must travel between its point of release and its point of impact, frictional forces which may result from contact between envelope 100 and guide rail 17 or guide rail 18 will also have insignificant effect on the speed of the envelope at time of impact with probe 21. Normally, the envelope will not contact either guide rail 17 or guide rail 18. The primary purpose of the guide rails is to maintain the envelope in a vertical position after the envelope has impinged against probe 21 and until proper disposition of the envelope is accomplished.

Figure 4:
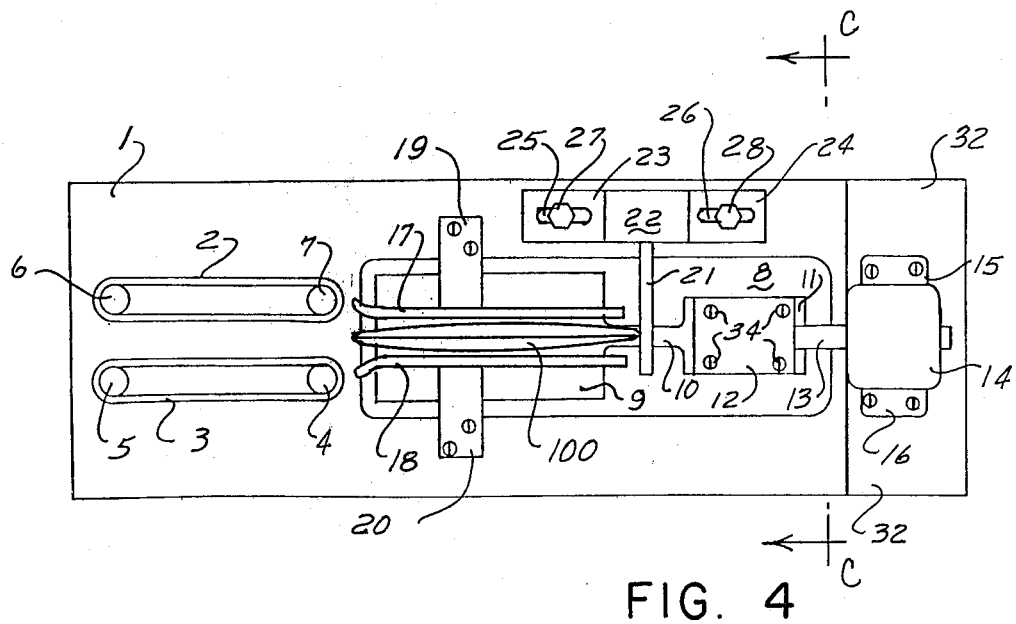
FIG. 4 is a plan view similar to FIG. 1, with the object in position at the instant it impinges against an elastic member shown in FIG. 1.

In FIG. 4, envelope 100 has impinged against probe 21. As will be more fully described later, probe 21 is attached to sensing means which is contained within housing 22. The structural combination of the probe and its associated sensor provide an elastic member that will reduce the velocity of envelope 100 to zero velocity. The rigidity of the elastic member is such that sufficient defamation or displacement will occur over a sufficient time period to enable measurement of the pulse resulting from impact. From the foregoing it should be readily apparent that the weight of envelope 100 can be determined by measuring the impulse, or change in momentum, of the envelope which resulted from impinging the envelope against probe 21. That is, an object of unknown mass in the form of envelope 100 has been moved at a known velocity to create a momentum. The change in momentum has been measured. Since momentum is a product of mass times the velocity, and in this case the velocity is substantially a constant, the impulse which has been measured will be proportional only to the mass of the object. Inasmuch as the weight of the object is equal to its mass divided by the acceleration of gravity, it, therefore, follows that the measured impulse will be directly proportional to and only proportional to the weight of the object.

Figure 5:
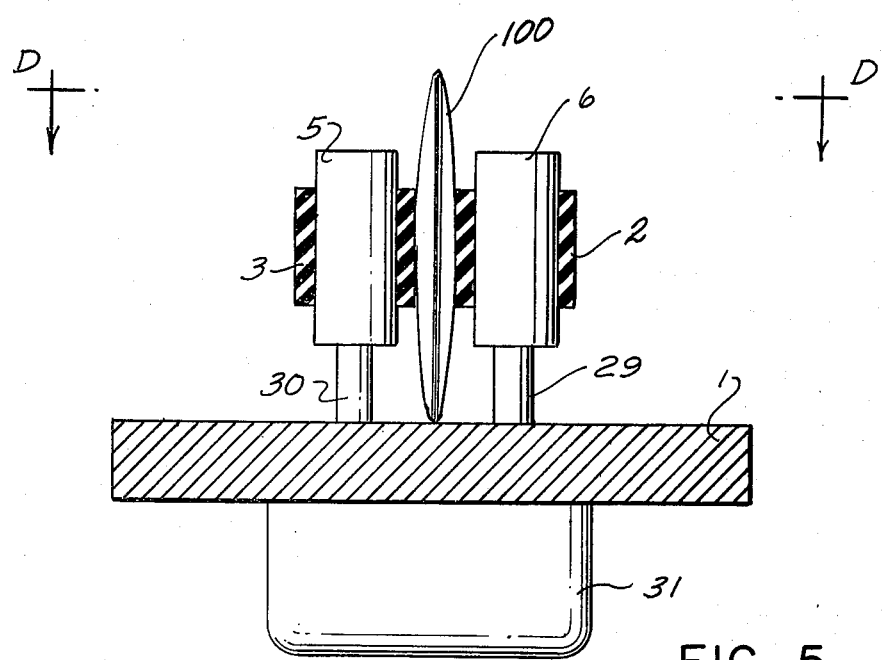
FIG. 5 is a cross-sectional view taken along line A—A of FIG. 2.

In order to more fully describe the embodiment of the invention shown in FIGS. 1-4, FIG. 5 is a cross-sectional view taken along like A—A of FIG. 2. Numerals designating the apparatus in FIG. 5 are common with the foregoing figures, except for the addition of shafts 29 and 30 and drive housing 31. Drive wheels 5 and 6 are driven at a constant speed by means of shafts 29 and 30, respectively. The drive shafts are in turn driven by constant speed motor means enclosed within housing 31 through chains or gears (not shown).

Figure 6:
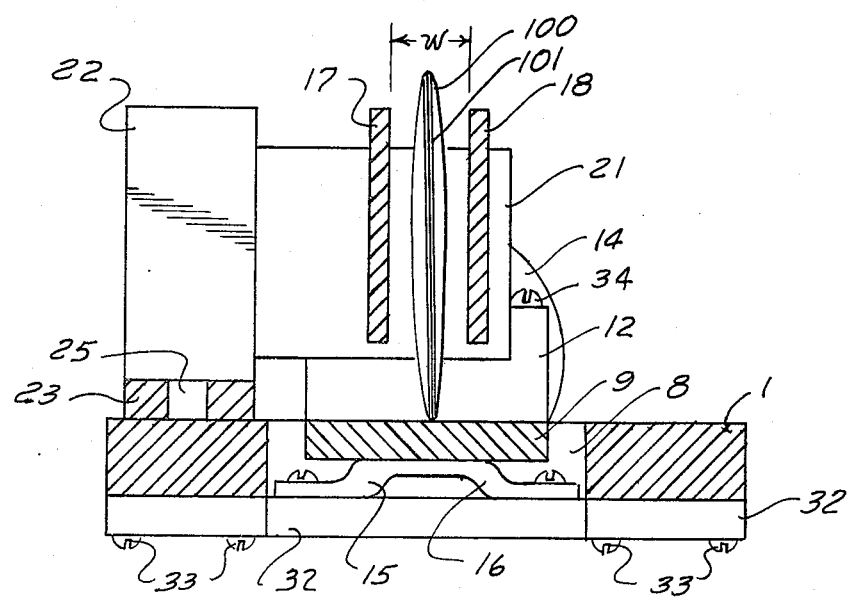
FIG. 6 is a cross-sectional view taken along line B—B of FIG. 3.

FIG. 6 is a cross-sectional view taken along line B—B of FIG. 3. It is readily apparent in this view that the bottom edge of envelope 100 may be supported by plate 9 during passage of the envelope between guide rails 17 and 18. Additional detail is shown as to the means of mounting motor 14 to plate 32 through mounting flanges 15 and 16. It can also be seen that the plate 32 is mounted to the bottom of plate 1 by means of screws 33. Probe 21 forms the end of a passageway between guides 17 and 18. The space between guide rails 17 and 18 may be adjustable, although the adjustment means are not shown in the foregoing figures. It is desirable that the distance W between guides 17 and 18 be set at an optimal value that will minimize the occurrences of contact between envelope 100 and either guide 17 or guide 18 until the measurement process has been completed.

Figure 7:
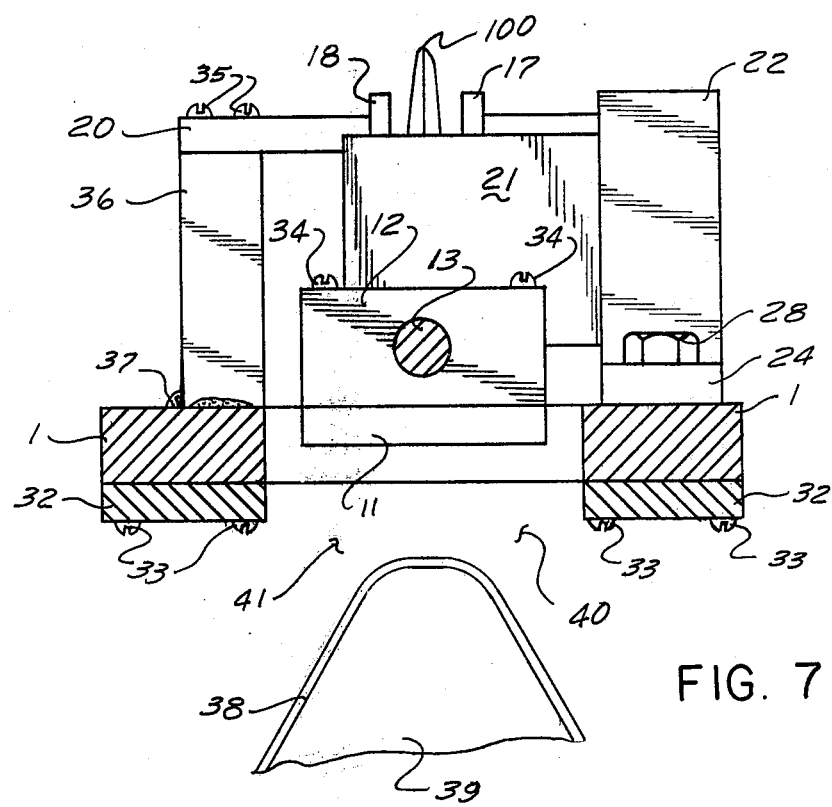
FIG. 7 is a cross-sectional view taken along line C—C of FIG. 4, illustrating a disposal means in a position occupied during the weighing cycle.

FIG. 7 is a cross-sectional view taken along line C—C of FIG. 4. In this FIG., ramp 38 has been added and the ramp is supported by member 39. Two distinct passageways are therefore created between ramp 38 and the two inner edges of plate 32. It is desired that envelope 100 be disposed through passageway 40 if the weight of envelope 100 is less than one ounce. In the event that the weight of envelope 100 is greater than one ounce, it is desired that the envelope be disposed through passage 41.

Post 36 has been added in FIG. 7 to more fully describe the support means for guide rail 18. Post 36 is attached to plate 1 by means of welds 37. Similar support means are provided (but not shown) for rail 17.

Figure 8:
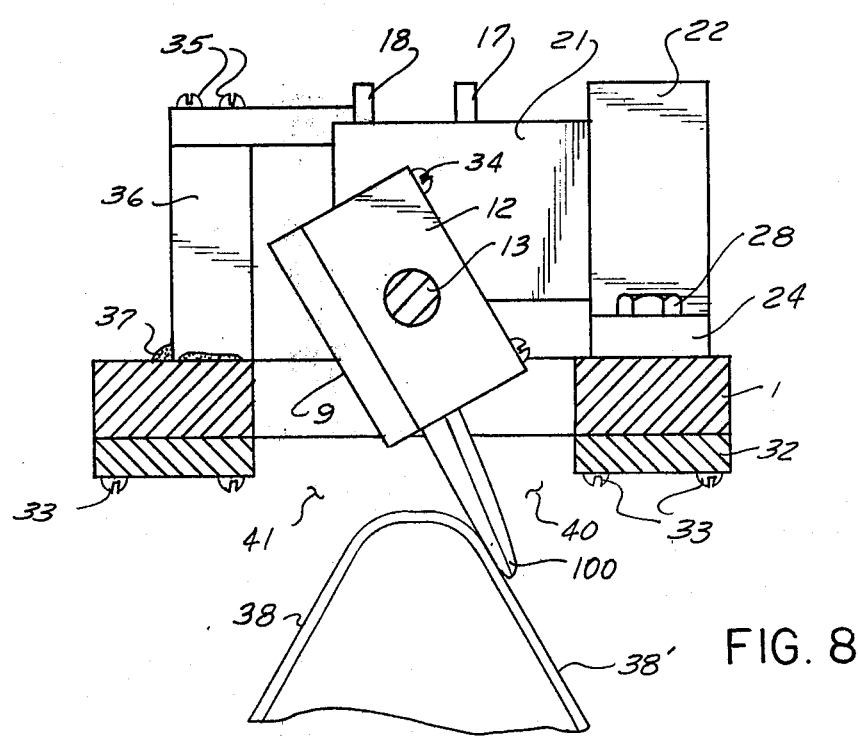
FIG. 8 is a view similar to FIG. 7 showing the disposal means in a position to move the object along a path determined by its weight.

In the example of FIG. 8, the weighing of envelope 100 has been completed, it has been determined that the envelope weight is less than one ounce and disposal of envelope 100 is being accomplished by rotating motor shaft 13 in a clock-wise direction. Plate portions 9, 10 and 11 have thereby been rotated allowing envelope 100 to drop vertically from its former position between guide rails 17 and 18. The angle to which plate 900 has been rotated controls the direction of disposition of envelope 100.

Figure 9:
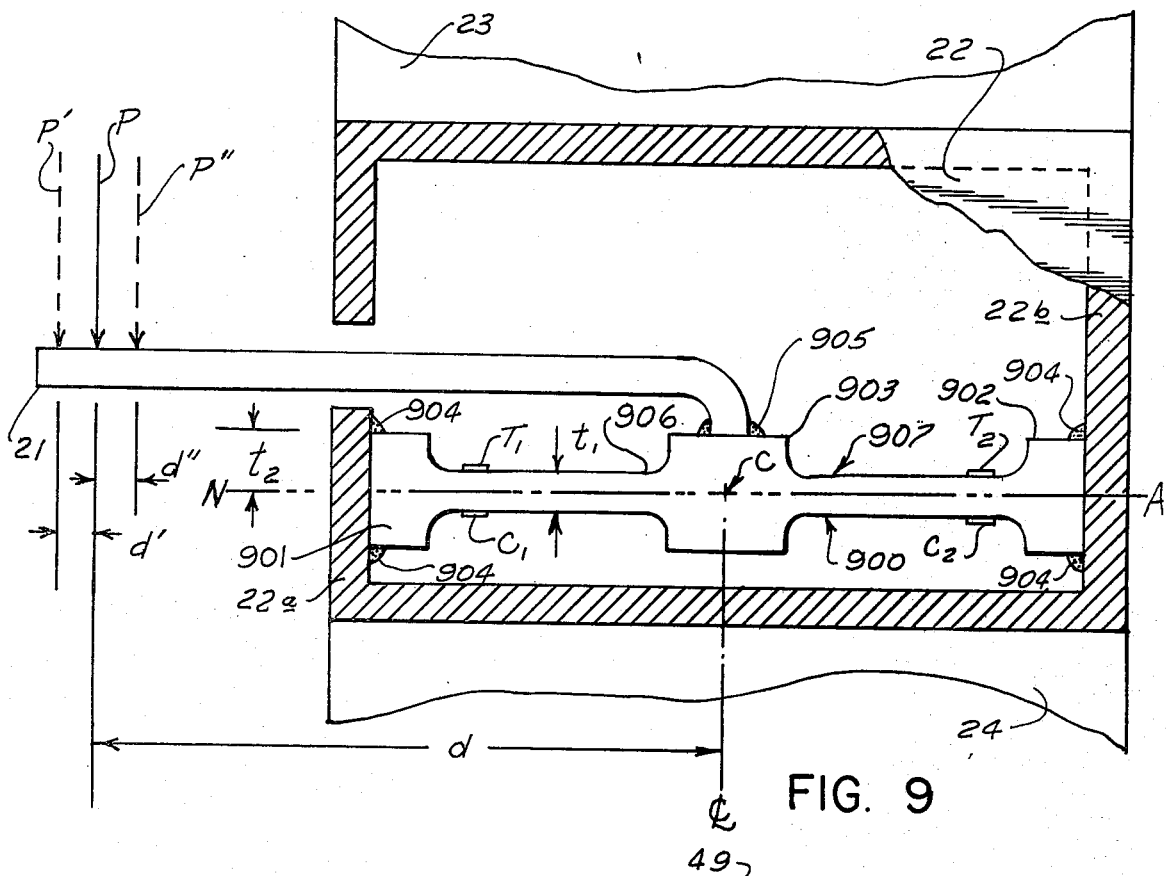
FIG. 9 is an enlarged fragmentary plan view of the probe illustrated in FIGS. 1-4 and sensor means to which the probe is attached, parts being broken away to more clearly illustrate details of construction.

In FIG. 9 a partially cut-away plan view of the probe 21 and its associated sensor structure is shown greatly enlarged and not necessarily in the same proportion as shown in the foregoing figures in order to achieve clarity of description. In this figure, impingement of envelope 100 against probe 21 has introduced a force P into probe 21. The location of force P is a distance d from the center of a sensing element 900. Sensing element 900 comprises a pair of beams 906 and 907, a pair of thickened end portions 901 and 902 and a thickened central portion 903. End portion 901 is attached to the fixed and rigid wall 22a of housing 22 by means of welds 904. Similarly, end portion 902 is attached to fixed and rigid wall 22b of housing 22. Probe 21 is attached to central portion 903 by means of welds 905. It is readily apparent that all of the welds 904 and 905 are located a distance $t_2$ above or below the neutral axis N–A of beam portions 906 and 907. It is readily apparent that the introduction of force P into probe 21 will be transmitted to sensor 900 in the form of a force P which is perpendicular to neutral axis N–A and a moment which is the product of force P times distance d.

Strain gages $T_1$ and $T_2$ are attached to the upper surfaces of beam portions 906 and 907, respectively. Strain gages $C_1$ and $C_2$ are attached to the lower surfaces of beams at positions directly below $T_1$ and $T_2$, respectively.

Figure 10:
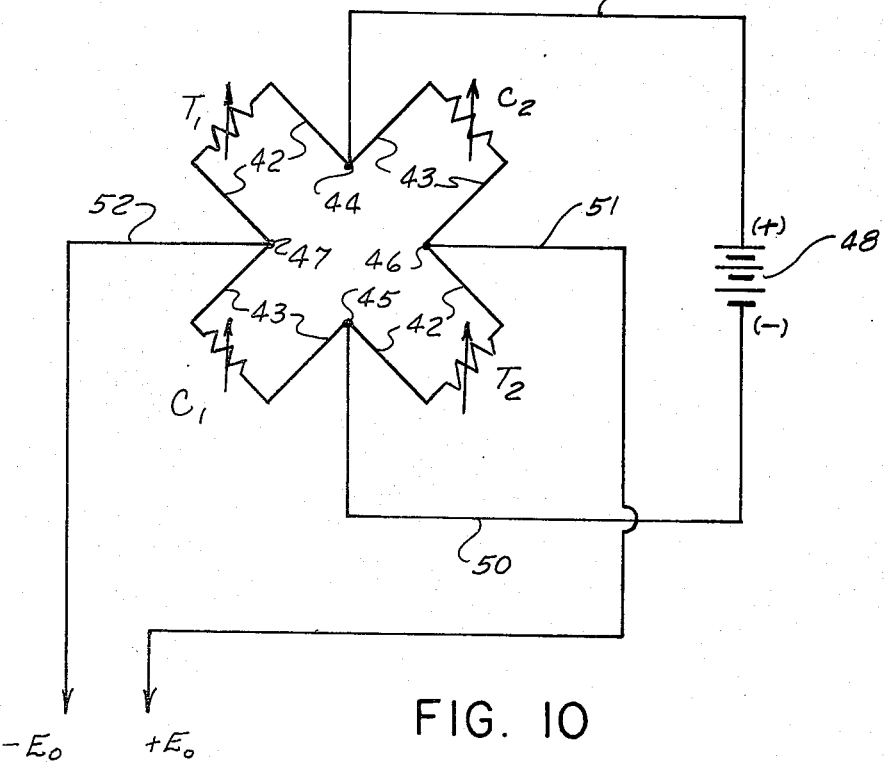
FIG. 10 is a schematic view of the electrical Wheatstone bridge circuit of the transducer shown in FIG. 9.

The four strain gages are connected in a Wheatstone bridge circuit by means of wire conductors 42 and 43 as shown in FIG. 10. Also in FIG. 10, an excitation voltage 48 is introduced into the Wheatstone bridge by means of conductors 49 and 50 connected to terminals 44 and 45, respectively. The output signal $E_0$ of the Wheatstone bridge can be obtained between conductors 51 and 52 which are connected to terminals 46 and 47, respectively. The value of $+E_0$ above the electrical balance point and the value of $-E_0$ below the electrical value of the balance point will depend upon mechanical stress, or strain, exerted on the four strain gages. The value of the total output $E_0$, which is the potential between $+E_0$ and $-E_0$, will be fed into a differential amplifier as will be hereinafter more fully described.

In the circuitry and structure of FIGS. 9 and 10, introducing increased tension into strain gages $T_1$ and $T_2$ will increase the value of output voltage $E_0$. Similarly, introduction of compression forces into strain gages $C_1$ and $C_2$ will increase the value of output signal $E_0$.

It will now be shown that the value of output signal $E_0$ will be proportional only to the magnitude of force P and will be unaffected by any moment resulting from the product of force P times distance d.

First, by superposition, it is necessary to look only at the force being introduced into sensor 900 in a direction that is perpendicular to neutral axis N–A. Force P is transmitted through probe 21 to the central portion of sensor 900. The sensor of FIG. 9 will bend so that central portion 903 is deflected in the direction of force P while the sensor acts as a beam in bending, where the two ends of the beam are rigidly fixed. Deflection of the central portion 903 will cause strain gages $T_1$ and $T_2$ to be subjected to tension and strain gages $C_1$ and $C_2$ will be subjected to compression as a result of bending the neutral axis N–A of the beam. Therefore, in view of the foregoing description of the circuitry of the Wheatstone bridge and strain gages, all four strain gages will be acting to increase the magnitude of output voltage $E_0$. Further, the magnitude of the voltage will be proportional to the magnitude of force P.

Now considering the moment introduced by force P times dimension d, and again by superposition, the moment will cause a rotation of central portion 903. Such rotation of central portion 903 will be in the counter-clockwise direction about point C. Pure rotation as a result of a moment will cause strain gage $T_1$ to go into compression which produces a negative value of output signal $E_0$. On the other hand strain gage $T_2$ will go into tension as a result of rotation and produce a positive value of output voltage $E_0$. The magnitude of the increased output voltage $E_0$ produced by strain gage $T_2$ will cancel the decreased output signal generated by strain gage $T_1$. Similarly, rotation of central portion 903 will cause strain gage $C_1$ to be subjected to tension, which is negative, and will cause strain gage $C_2$ to go into compression, which is positive. As in the case of the cancellation of signals from strain gages $T_1$ and $T_2$, strain gages $C_1$ and $C_2$ will cancel their effects upon output signal $E_0$. Therefore, it can be seen that the magnitude of the moment produced by force P times distance d will not be seen in the output signal $E_0$, regardless of the magnitude of force P or the dimension of distance d.

Now considering the fact that the envelope, or other object being weighed, will not necessarily impact probe 21 at the precise location as shown for force P, introduction of a force P' (equal to force P) times distance (d+d') will create a moment of a different magnitude. Similarly, force P" introduced a distance d" less than dimension d will create a moment of another magnitude. However, it has been shown by the foregoing that the sensor is sensitive only to linear force in the direction of force P and the sensor is insensitive to moment.

It is therefore obvious that a significant variation in the location at which force P is introduced into the probe 21 can be tolerated. The importance of this tolerance is to enable adjustment of rails 17 and 18 sufficiently far apart that they will not produce a frictional binding on envelope 100. Further, it can be seen that the function of guides 17 and 18 is not necessarily to position the load for measurement purposes. It has now been established that the output signal $E_0$, which is the potential between $+E_0$ of conductor 51 and $-E_0$ of conductor 52, is proportional only to the force resulting from momentum. It has also been shown that the momentum is proportional to the weight of the object. The block diagram of FIG. 11 describes the manner in which the output signal $E_0$ is utilized to make decisions with respect to disposition of the object, in this case, envelope 100. In FIG. 11, conductors 51 and 52 carry the output voltage signal to filter 53. Filter 53 serves to damp out any high frequency vibratory signals. Filter 53 is a low pass filter so that high frequency noise will be filtered out, yet impulse signals will be permitted to pass. It is necessary that the critical frequency of the filter be selected relative to the magnitude of the impulse in terms of both force and time which depend upon the relative rigidity of the sensor. The filtered output signal $E_0$ is conducted through conductors 54 and 55 to primary amplifier 56. Amplifier 56 produces a magnified voltage signal for measurement and transmits the signal through conductor 57 to a secondary amplifier 58. Amplifier 58 is also a differential amplifier and receives the voltage signal from conductor 57 through its positive terminal. Amplifier 58 is biased into negative saturation by a variable voltage reference source 59, which reference source introduces a selected bias voltage through conductor 60 into the negative terminal of amplifier 58. If, for example, it is determined by calibration that the output of sensor 900 will introduce one volt into the plus terminal of amplifier 58 for a one ounce letter, then the reference voltage value generated by source 59 would be set at 1 volt and be introduced through conductor 60 into the negative terminal of amplifier 58 as a minus 1 volt bias. In such a manner there will be no output from amplifier 58 into conductor 62 when no load is present. Any output signal from sensor 900 which produces less than 1 volt at the negative terminal of amplifier 58 will not cause an output from amplifier 58. Any output of sensor 900 which reasonably exceeds 1 volt will cause amplifier 58 to go into positive saturation and produce a signal in conductor 62. Logic 61 is provided to receive voltage from amplifier 56 through conductor 64 and issue a control command to motor 14 through conductors 63a and 63b. The polarity of the control command will cause the motor 14 to rotate in a clock-wise direction if there is no signal on conductor 62 from amplifier 58 (envelope 100 is less than one ounce) and in a counter-clockwise direction if there is a signal on conductor 62 (envelope 100 has a weight in excess of one ounce) to accomplish controlled disposal of the envelopes into groups that are over or under one ounce.

The contents of envelope 100 are shown as a group of papers 101 in FIG. 12. The papers are of unequal lengths and, perhaps, of unequal thicknesses. The random arrangement of the papers 101 in envelope 100 permits a random void area 102 to be present near the leading edge of envelope 100. At the time envelope 100 impinges against probe 21, it is desirable that the envelope 100 and its contents 101 act as one unified mass during the impulse period. However, it is probable that the contents 101 will slide during the impact period and assume a position as shown in FIG. 13. In FIG. 13, the contents 101' of envelope 100' have shifted to the leading edge of the envelope and void 102 no longer exists. Such sliding, or shifting, of the contents of the envelope will to some degree be accomplished by overcoming frictional forces between the surfaces of the papers 101 and the envelope 100. The measurement technique described in this invention depends upon the entire mass impacting as one unified body during a known pulse period. Any tendency of various elements of the mass decelerating at different rates will tend to introduce errors into the measured weight. In many cases, the error will be tolerable. However, where extreme accuracy is required, it is desirable to pre-condition the envelope and its contents before measuring the loss of momentum. In FIG. 14 a second embodiment of the invention is described. In this embodiment provision is made for pre-conditioning the object to be measured and provision is also made for maintaining uniform spacing between individual objects in a series of objects.

As shown in FIG. 14, three envelopes are being conveyed through the system: envelope 200 is engaged by drive belts 2 and 3; envelope 201 is engaged by drive belts 72 and 73; and envelope 202 is engaged by drive belts 432 and 433. A short time earlier in the handling cycle, envelope 202 had been conveyed by belts 332 and 333, and envelope 201 had been conveyed by drive belts 232 and 233. As can be seen in the figure, the distance between each drive belt and its oppositely situated drive belt is constant throughout the system. Further, drive belts 232 and 233 are closer to each other than the distance between guide rails 217 and 218. Similarly, drive belts 332 and 333 are closer to each other than the distance between guide rails 317 and 318. Therefore, all drive belts will act to convey envelopes through the system without contact between the envelopes and guide rails. Drive rollers 204, 205, 206, 207, 74, 75, 76, 77, 304, 305, 306, 307, 405, and 406 are all driven and rotate at the same speeds as rollers 4, 5, 6, 7. A fixed base plate 1' extends from left to right throughout the figure. While not shown in this figure, drive rollers 4, 5, 6, 7, 74, 75, 76, 77, 405 and 406 are all fixed position rollers and are mounted on structure that is common with plate 1'. Rollers 206, 207, 306 and 307 are mounted on moveable plate 202a. Similarly, rollers 205, 204, 305 and 304 are mounted on moveable plate 202b. Plates 202a and 202b in FIG. 14 are shown in the drive position, i.e., the position at which they will contact and drive the envelope through the system.

Probe 221 is mounted to bracket 223, which bracket is supported by moveable plate 203. Similarly, probe 321 is attached in housing 322 and mounted by means of flanges 323 and 324 to moveable plate 203. Moveable plate 203 is shown in FIG. 14 in its retracted position so that the probes 221 and 321 are removed from the path of the envelopes.

Figure 15:
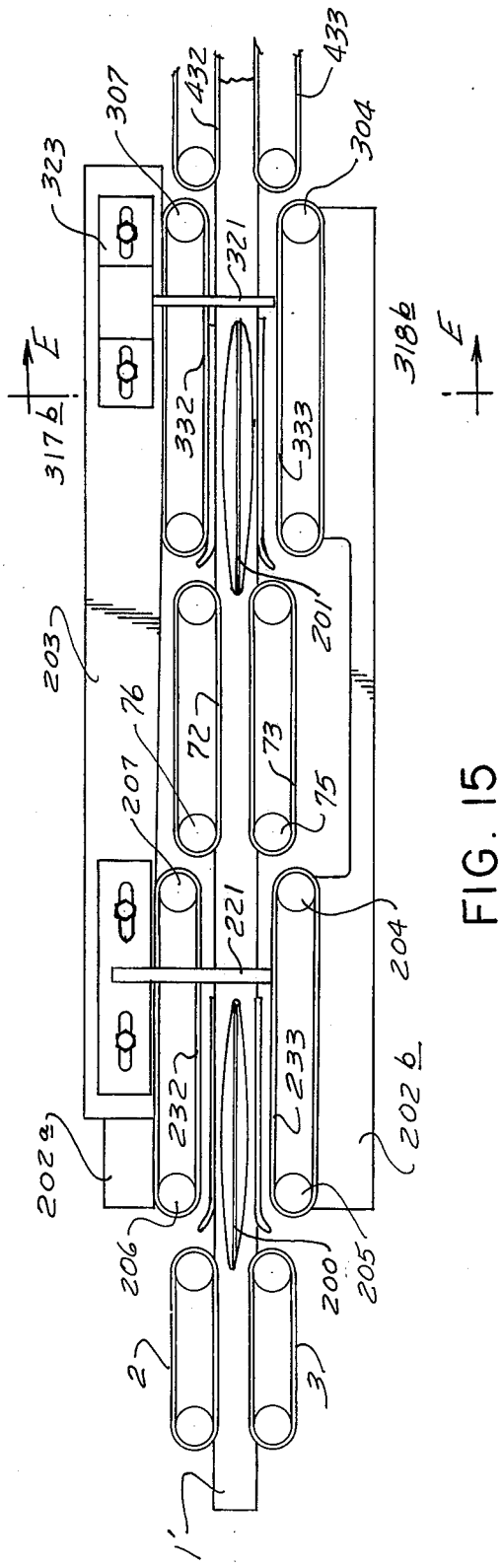
FIG. 15 is a plan view similar to FIG. 14 but at a later phase in the operating cycle.

In FIG. 15 moveable plate 203 has moved toward the path of the envelopes so that probes 221 and 321 are in the paths of envelopes 200 and 201, respectively. Envelope 200 has at this instant been released by drive belts 2 and 3. Envelope 201 has just been released by drive belts 72 and 73. Envelopes 200 and 201 are moving at a known velocity toward their respective probes. In order to avoid affecting the substantially free moving and constant velocity of envelopes 200 and 201, moveable plates 202a and 202b have been retracted away from the envelopes. Therefore, drive belts 232, 233, 332 and 333 have been retracted from engagement with the envelopes. The means for sequentially moving plates 203, 202a and 202b are more fully described later.

Assuming that envelope 200 has contents arranged in a random fashion as shown for envelope 100 in FIG. 12, probe 221 will serve to create an impact force on the envelope that will cause the contents of envelope 200 to slide forward and assume the position of contents 101' in FIG. 13. In this manner, the contents of the envelope are pre-conditioned to act as a unified mass when measurement is later made by probe 321.

Figure 16:
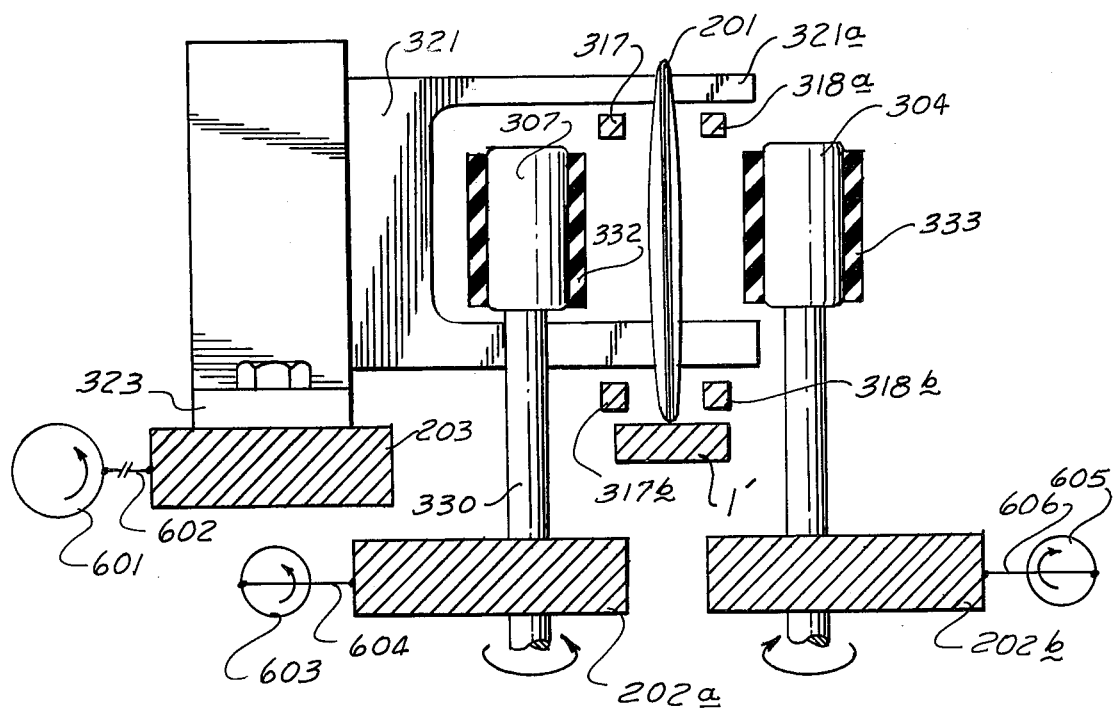
FIG. 16 is a cross-sectional view taken along line E—E of FIGS. 14 and 15, with the object in position as in FIG. 15.

Envelope 201 has already gone through the pre-conditioning cycle against probe 221. Therefore, envelope 201 will momentarily impinge against probe 321 for the purpose of determining the weight of envelope 201. In FIG. 16, the relative positions of the various components of the system are shown in a cross-sectional view taken along line E—E of FIG. 15. The position of moveable plate 203 and moveable plates 202a and 202b are as shown in FIG. 15. The retracting and forward movement mechanism for plates 203, 202a and 202b are shown schematically in FIG. 16, where plate 203 has been moved forward by linkage 602 as a result of the angular position of crank 601. Plates 202a and 202b have been retracted as a result of the angular position of cranks 603 and 605 acting on linkages 604 and 605, respectively. The speed of angular rotation of crank 601, crank 603 and crank 605 are constant relative to one another. In this manner the drive belts 332 and 333 are retracted when probe 321 enters the path of envelope 201. Later in the cycle probe 321 will be retracted before drive belts 332 and 333 engage envelope 201. Guide rails 317a, 317b, 318a and 318b are shown, but their mounting structure is not shown. As previously described, however, the guide rails remain in a fixed position at all times along with plate 1'. In order to provide clearance of the guide rails and the drive belts, probe 321 has a portion of its area cut away to provide narrow portion 321a and narrow portion 321b. In this figure, drive rollers 304 and 307 are shown being driven by shafts 329 and 330, respectively, and in the directions of rotation shown by the arrows about the shafts. Shafts 329 and 330 project downwardly through plates 202b and 202a, respectively, to engage constant speed driving mechanism which is not shown.

Figure 17:
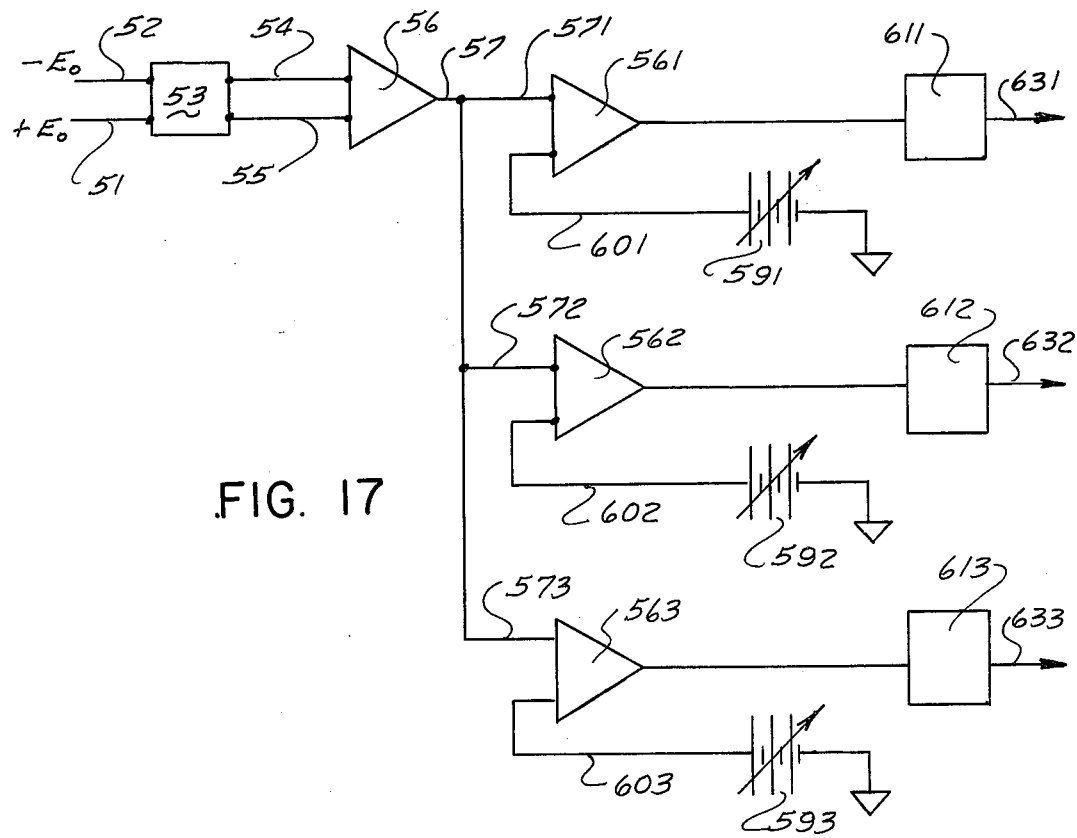
FIG. 17 is a block diagram of the electronic instrumentation to control labelling at a plurality of weight values.

Now, in reference to FIG. 17, an output signal is presented as +Eo in conductor 51 and −Eo in conductor 52 in the same manner as previously described in FIG. 11. A filter 53 is provided for the same purposes as previously discussed. Conductors 54 and 55 convey the filtered signal to primary amplifier 56. The output of amplifier 56 is transmitted along conductor 57 in the same manner as in FIG. 11. Now, however, measurement is desired at a number of different weight levels instead of the simple over-and-under measurement of FIG. 11. Therefore, conductor 57 is connected in parallel to conductors 571, 572 and 573. Secondary amplifier 561 is biased by reference voltage 591 entering the amplifier through conductor 601. In this case, for example, reference voltage 591 can be adjusted to a level that will cause the output of amplifier 561 to be triggered for all envelopes which weigh more than one ounce. As a result, every envelope that weighs over one ounce will enter logic component 611 and be transmitted by conductor 631 as a signal to a readout or printer.

In a similar manner, amplifier 562 is supplied with another reference voltage 592 through conductor 602 so that the output of amplifier 562 will only trigger logic 612 when the envelope weighs more than two ounces. As a result, a signal will be transmitted on conductor 632 each time an envelope is weighed to more than two ounces. Amplifier 563, voltage reference 593, conductor 603 and logic 613 act in a similar manner to transmit a voltage on conductor 633 each time an envelope passes which weighs more than three ounces. A printer can be driven by the three outputs, provided that additional logic is furnished to cause the printer to print only the highest value signal received. For example, a three ounce envelope will cause signals to be generated on each of conductors 631, 632 and 633. In that case, the higher value signal, conductor 633, will control the printing.

High speed printers capable of receiving signals from conductors 631, 632 and 633, are well known to persons skilled in the art. The logic for driving the printer will depend upon the type of printer selected, as for example, teletype may require serial transmission while a line printer may require parallel transmission. The more recent development of ink jet printers is readily adaptable to this type of system.

Figure 18:
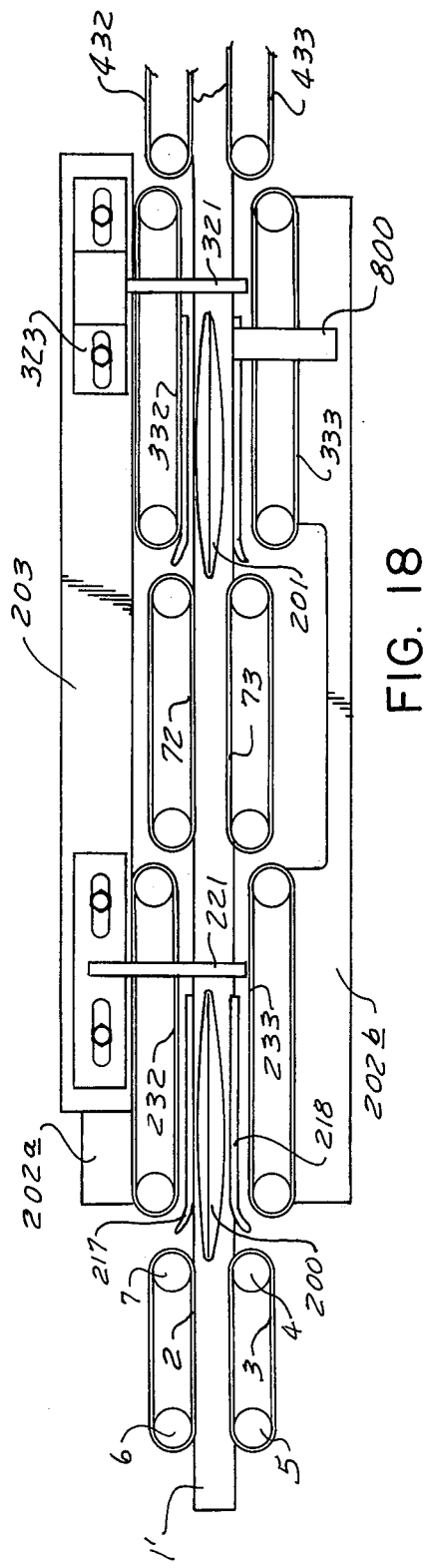
FIG. 18 is a plan view of apparatus of FIG. 15 with the addition of a labelling device.

The application, by way of example, of an ink jet printer is shown in FIG. 18. Printer 800 is mounted in a fixed position relative to the path of the envelope. Printer 800 does not move during the cycle as does moveable plate 202b. Printer 800 is positioned so that as soon as the weight has been determined by impinging envelope 201 against probe 321, the appropriate value of the postage will be printed on the envelope in the proper position. It should be readily apparent that the indicia printed on the parcel, in this case an envelope, will be proportional to the weight of the parcel. In this case, the indicia would represent the price of the postage.

In other applications, as for example packages of meat, the printing could indicate the gross weight as well as the price of the package which is proportional to gross weight. Similarly, the information which is printed on the package may indicate the number of pieces contained in the package, which would also be proportional to the gross weight. While not shown in the foregoing descriptions, many commercial operations would make it desirable to provide a totalizing operation. For example, the sum of the weight of all packages of meat which pass through a given apparatus during a given period of time may be desirable information for production control. Further, the total price of all packages of meat which are produced during a given period of time may be of significant interest to the processor. In the case of applying postage to envelopes for purposes of mailing in the United States Mail, it would be necessary to have a postage totalizer for enabling transactions with the Post Office Department in paying for the sum of the postage used. In any case, an accumulator function suitable for addition to the logic to receive signals from conductors 631, 632 and 633 is well known to persons skilled in the art. Such device preferably would include a key lock to prevent re-setting of the accumulation by unauthorized persons.

It should be readily apparent that sensor means other than those described in the foregoing disclosure may be utilized. For example, a flat plate backed-up by a calibrated spring could be positioned at the end of the path shown in FIGS. 1-11. Displacement of the plate will result from impact by the object being weighed. While such displacement will be proportional to the weight under ideal conditions, lateral deviation of the object from its ideal path along the centerline may result in erroneous signals. In a like manner, pressure transducers may be used to provide a hydro-mechanical transducer. However, off-center loading of the transducer may result in binding of the piston during its movement to compress the pressurized material.

Instead of a cantilever bar as shown by members 21 and 321, above, a bar which spans from one side of the path to the other could be mounted on two load cells, whereby one load cell would support each end of the bar. In this type of embodiment, the pair of load cells could be rotated according to a pre-determined time cycle to raise or lower the bar to accomplish a clear path or to impact the objects as desired. Utilization of a bar supported by a pair of load cells, wherein the bar is rotatably moved into and out of position, may be limited to those cases where it is satisfactory to engage only a portion of the object to be measured. Where it is desirable to contact the object along both the top and the bottom of its leading edge for purposes of measuring impact, two bars would be required wherein each bar is provided with its own pair of load cells.

In selecting a transducer design and means of retraction during the operating cycle, consideration should be given to potential spurious signals which may be generated by accelerating the mass of the transducer itself. However, in the case of the transducer of FIG. 9, acceleration of the transducer in a direction parallel to neutral axis N-A will produce no significant signal. Any internal force parallel to axis N-A will act on strain gages T, and C, equally (both tension or both compression) and be cancelled out. Similarly, such forces acting on gages $T_2$ and $C_2$ will also be cancelled out.

It should be readily apparent that the method and apparatus hereinbefore described accomplishes the objects of the invention.

It should be appreciated that other and further embodiments of the invention may be devised without departing from the basic concept thereof.

Having described my invention, I claim:

1. In a method of determining the weight of a plurality of objects combined in a parcel, the steps of: moving the parcel into engagement with a stop member to position the objects relative to each other in the parcel; moving the parcel containing the positioned objects at a known velocity to impact against an elastic probe surface to reduce the velocity of the parcel to zero; and generating a signal upon impact of a magnitude which is related to the magnitude of the momentum of the parcel before impact.

2. The method of claim 1, the step of generating a signal comprising the steps of: delivering an electrical signal to a strain gage of known resistance associated with the probe surface against which the parcel impacts; and generating a signal of the magnitude which is related to the magnitude of displacement of the probe surface impacted by the parcel.

3. The method of claim 1 with the addition of the step of: directing the parcel to a first route in response to a signal of less than a pre-determined magnitude and directing the parcel to a second route in response to a signal of greater than said pre-determined magnitude.

4. A meter to print indicia related to weight on parcels containing a plurality of objects moved along a path comprising: means to impact the parcels against a stop to position each object in the parcel adjacent to front end of the parcel; a probe; means to move the parcel at a known velocity such that the front end of the parcel impacts against the probe; means to generate a signal related to the displacement of the probe; and means to print indicia related to the weight of said parcel on said parcel in response to said signal.

5. In a device to determine weight of an object, the combination of: a probe; means to position said probe in a path; means to move the object at a pre-determined velocity along said path such that the object will directly impact against said probe; and sensor means associated with said probe to indicate the magnitude of the change in momentum of the object as a result of impacting said probe.

6. In a device to determine weight according to claim 5, said means to move the object at a pre-determined velocity along a path comprising: spaced drive members engaging opposite sides of the object; and means to move said spaced members at a pre-determined velocity.

7. In a device to determine the weight according to claim 6, with the addition of: guide means spaced from said drive members, said guide means being adapted to receive the object from the drive members adjacent said probe and to direct the object along the path toward the probe without changing the speed or direction of the object to assure unrestrained motion when the object impinges against said probe.

8. In a method of determining the weight of a plurality of objects combined in a parcel, the steps of: moving the parcel into engagement with a stop member to position the objects relative to each other in the parcel; moving the parcel containing the positioned objects at a known velocity to impact against a probe surface; causing the parcel to impact against a probe surface on a cantilever beam extending parallel to a member supporting the cantilever beam; and generating a signal related to the magnitude of the force applied to the member supporting the cantilever beam, said signal being independent of the moment of the force acting on the member supporting the cantilever beam as a result of force applied to the cantilever beam upon the impact of the parcel.

9. The method of claim 8 with the addition of the step of: directing the parcel to a first route in response to a signal of less than a pre-determined magnitude and directing the parcel to a second route in response to a signal of greater than said pre-determined magnitude.

10. The method of claim 8 with the addition of the step of: printing indicia related to the weight of the parcel on the parcel in response to said signal.

11. In a method of determining the weight of a plurality of objects combined in a parcel, the steps of: moving the parcel into engagement with a stop member to position the objects relative to each other in the parcel;

moving the parcel containing the positioned objects at a known velocity to impact against a probe surface; generating a signal upon impact of a magnitude which is related to the magnitude of the momentum of the parcel before impact; and printing indicia related to the weight of the parcel on the parcel in response to said signal.

12. In a device to determine the weight of an object, the combination of: a probe; means to position said probe in a path; spaced drive members engaging opposite sides of the object; means to move said spaced drive members at a pre-determined velocity; support means spaced from said drive members and positioned below said path and adjacent opposite sides of said path to maintain a thin flat object in a substantially vertical plane to minimize aerodynamic effects on the moving object, said guide means being adaped to receive the object from the drive members adjacent said probe and to direct the object along the path toward the probe without changing the speed or direction of the object to assure unrestrained motion when the object impinges against said probe; and sensor means associated with said probe to indicate the magnitude of displacement of said probe as a result of being impacted by said object.

13. In a device to determine the weight of an object, the combination of: a cantilever beam; means to position said beam in a path; means to move the object at a pre-determined velocity along said path such that the object will impact against said beam; and sensor means associated with said beam to indicate the magnitude of displacement of said beam as a result of being impacted by said object, said sensor means including strain gages in a Wheatstone bridge circuit calibrated to deliver a signal related to the magntiude of force acting on the cantilever beam as a result of impact of the object.

14. In a device to determine weight of an object, the combination of: a probe; means to position said probe in a path; means to move the object at a pre-determined velocity along said path such that the object will impact against said probe; and sensor means associated with said probe to indicate the magnitude of displacement of said probe as a result of being impacted by said object, said sensor means comprising: a beam having a neutral axis; a pair of compression strain gages secured to the surface on one side of said neutral axis; and a pair of tension strain gages secured to the surface of the beam on the opposite side of the neutral axis, said strain gages being connected to a Wheatstone bridge circuit calibrated to deliver a signal related to the magnitude of force acting on said probe and independent of the location at which the force is applied.

15. In a device to determine weight according to claim 14 with the addition of beam support means secured to said beam at locations which are spaced above and below the neutral axis of said beam by a dimension greater than the spacing between the neutral axis and strain gages secured to surfaces of the beam and means for introducing the force to be measured into the beam where the point of introduction of the force is located a distance further from the neutral axis than the distance between the neutral axis and any of the strain gages attached to the surface of said beam, so that bending of the beam at any position on the beam will not be affected in a localized area as a result of the method of supporting the beam or introducing the force into the beam.

16. In a device to determine weight according to claim 14, said probe comprising an L-shaped member having a leg extending parallel to the neutral axis of the beam secured to an arm which is rigidly secured to the center of the beam.

17. In a device to determine weight according to claims 16 or 13, with the addition of: means operably connected to said circuit to print indicia on the object related to the weight of the object in response to said signal.

18. In a device to determine weight according to claims 16 or 13 with the addition of: means operably connected to said circuit to direct the object to a first route if said signal is less than a pre-determined magnitude and to direct the object to a second route if said signal exceeds a pre-determined magnitude.

* * * * *